United States Patent [19]

Stolzer

[11] 4,015,500
[45] Apr. 5, 1977

[54] BOW SAW MACHINE

[75] Inventor: Paul Stolzer, Achern, Germany

[73] Assignee: KEURO Maschinenbau Gesellschaft mit beschrankter Haftung & Co., Kommanditgesellschaft, Achern, Germany

[22] Filed: June 3, 1976

[21] Appl. No.: 692,303

[52] U.S. Cl. .................................. 83/755; 83/759; 83/757; 83/647; 83/756

[51] Int. Cl.$^2$ ........................................ B23D 51/20

[58] Field of Search ............ 83/753, 754, 755, 756, 83/757, 759, 773, 772, 647

[56] References Cited

UNITED STATES PATENTS

3,492,902  2/1970  Stolzer ............................ 83/647 X

Primary Examiner—Willie G. Abercrombie
Attorney, Agent, or Firm—Spencer & Kaye

[57] ABSTRACT

A bow saw machine has a machine frame; a device for immobilizing a workpiece in the machine; a housing pivotally attached to the machine frame for providing for a swinging motion of the housing generally in a vertical plane; a saw bow supporting a saw blade in a generally horizontal orientation during the sawing operation; a guide supported in the housing for longitudinally displaceably mounting the saw bow; a drive motor; a crank drive supported in the housing and having a generally vertically oriented drive shaft eccentrically coupled to the saw bow for effecting a reciprocating motion thereof along a path of reciprocation determined by the saw bow guide. The crank drive is located above the saw bow substantially within the zone of its path of reciprocation. The bow saw machine further has a hydraulic cylinder-and-piston assembly for controlling the sawing pressure and the feed of the saw blade; a bell crank having first and second arms extending from its pivotal support and being arranged at an angle to one another. The first arm is pivotally connected to the cylinder-and-piston assembly, while the second arm is coupled to a horizontal push rod reciprocated horizontally by virtue of its eccentric connection to the shaft of the crank drive. This arrangement provides that the saw blade is lifted off the workpiece during each idle stroke of the saw bow and is lowered into a sawing position for the beginning of each work stroke.

11 Claims, 4 Drawing Figures

BOW SAW MACHINE

BACKGROUND OF THE INVENTION

This invention relates to a bow saw machine which has a saw blade tensioned obliquely with respect to the direction in which the saw bow is guided (reciprocated) and a machine frame, on the work table of which the workpiece is immobilized by means of clamping jaws during the sawing operation. At least one of the clamping jaws is displaceably mounted. The back of the saw bow is enlarged twice in a web-like manner on both sides in a direction transverse to the reciprocating motion of the saw bow. The ends of the webs of the saw bow are displaceably supported on a housing which is, in turn, pivotally supported on the machine frame for swinging in a substantially vertical plane. The bow saw machine further has a saw bow drive constituted by a motor-driven crank drive coupled to the saw bow and arranged about the back of the saw bow substantially within the zone of saw bow stroke (path of reciprocation). The rotary axis of the rotary shaft of the crank drive extends substantially in a vertical direction and lies in, or is parallel to, the plane of the saw blade. The drive shaft carries an eccentric crank pin which projects into a guide groove provided on the back of the saw bow. The guide groove extends parallel to the above-noted web-like enlargements.

A bow saw machine of the above-outlined type is known and is disclosed, for example, in German Published Accepted Patent Application (Auslegeschrift) No. 2,262,957. This bow saw machine accomplishes the object of reducing the spatial requirement in the direction of reciprocation, practically to the length of the saw bow including the length of its stroke while, at the same time, providing for a high sawing efficiency. In essence, this is achieved by arranging the crank drive above the saw bow such that its drive shaft is arranged perpendicularly to the saw bow. If, however, it is desired to equip such a bow saw machine with a hydraulic device for an automatic setting of the saw blade on the workpiece (setting of the cutting depth for the successive work stroke) as well as for the regulation of the sawing pressure, difficulties are encountered because such a hydraulic setting device constitutes a coupling between the machine frame and the pivotal housing and further, it cooperates with the crank drive. But, in the above-described structure, the saw bow and its travelling path are positioned in such a manner that they would constitute an obstruction for such a cooperation. Since the connection between the crank drive and the saw bow is effected in most cases by means of an eccentric arranged on the crank shaft, the above-noted vertical position of the crank shaft gives rise to the further difficulty that the eccentric would lie and be effective substantially in a horizontal plane, thus not allowing a generation of the substantially vertical pivotal motion of the housing that contains the saw bow guide.

Regarding the above-mentioned device for setting the saw blade in the direction of the workpiece (feed setting) as well as for providing the sawing pressure, reference is made to the disclosure in German Pat. No. 1,068,086. The device described therein comprises in essence a double-acting cylinder-and-piston assembly, the bilateral cylinder chambers of which are coupled to one another by a fluid transfer conduit in which there is arranged an adjustable throttle valve with which the setting of the saw blade in the direction of the workpiece can be adjusted. This is accomplished by providing that during the idling stroke, the piston is lowered to a greater or lesser extent under the weight of the pivotal machine component. During the work stroke, the piston is exposed to the sawing pressure in the opposite direction. During this occurrence a sawing pressure valve which adjoins a cylinder chamber then pressurized, provides that the desired sawing pressure is not exceeded. This is achieved by ensuring that from the pressurized cylinder chamber the pressurized medium may flow into a sump (depressurized reservoir) through the sawing pressure valve.

SUMMARY OF THE INVENTION

It is an object of the invention to provide an improved bow saw machine of the above-outlined type which is equipped in a simple and compact manner with a hydraulic device for controlling the saw blade feed and the sawing pressure without losing, at the same time, the advantages of the above-described known bow saw machine.

This object and others to become apparent as the specification progresses are accomplished by the invention, according to which, briefly stated, the bow saw machine has a hydraulic cylinder-and-piston assembly for controlling the sawing pressure and the feed of the saw blade; a bell crank pivotally attached to the vertically swingable housing and having first and second arms extending from its pivotal support and being arranged at an angle to one another. The first arm is pivotally connected to the cylinder-and-piston assembly, while the second arm is coupled to a horizontal push rod reciprocated horizontally by virtue of its eccentric connection to the shaft of the crank drive. This arrangement provides that the saw blade is lifted off the workpiece during each idle stroke of the saw bow and is lowered into a sawing position for the beginning of each work stroke.

It has been found particularly advantageous to arrange the cylinder-and-piston assembly adjacent the path of motion of the saw bow at that end which is next to the pivotal support for the housing. Advantageously, the bell crank is of L-shape with unequal arms and is connected with its short arm to the piston rod of the cylinder-and-piston assembly, while its long arm, which is articulated to the push rod, is arranged — as viewed from the pivotal support for the bell crank — behind the path of motion of the saw bow in a substantially vertical orientation within the housing.

By virtue of the above features according to the invention, the motion executed by a substantially horizontally effective eccentric can be transmitted to the essentially vertically effective cylinder-and-piston assembly.

According to further advantageous features of the invention, the cylinder-and-piston assembly is provided with a double-acting piston disposed in a cylinder which is fluid-tight on both sides; the two cylinder chambers are coupled to one another with a fluid transfer channel containing an adjustable feed control valve for determining, between work strokes, the orientation of the saw blade in the direction of the workpiece; further, that cylinder chamber, whose volume is being reduced as the saw blade is lowered for the feed setting, is coupled with a reservoir. Further, the hydraulic fluid may flow from the other cylinder chamber through an adjustable sawing pressure valve into the hydraulic fluid reservoir under the effect of the sawing pressure.

According to further features of the invention, the feed control valve and the fluid transfer channel are arranged in the piston; the feed control valve is constituted by a needle valve passing coaxially through the hollow piston rod; the needle valve is adjustable by an eccentric which is connected to the opposite end of the valve needle and which is supported at the joint between the bell crank and the piston rod. In order to prevent pressurized liquid from flowing backward in the transfer channel during the work stroke, it is expedient to arrange a check valve in the channel upstream of the feed control valve (as viewed in the direction of normal flow of the fluid in the channel).

According to further advantageous features of the invention, the liquid reservoir is constituted by a jacket surrounding the cylinder of the cylinder-and-piston assembly; further, from the reservoir there extends a check valve-controlled suction channel into that cylinder chamber whose volume is being reduced as the saw blade is lowered for the feed setting and further, the sawing pressure valve arranged in the cylinder has a discharge port which communicates with the inner space (reservoir) of the jacket.

DESCRIPTION OF THE PREFERRED EMBODIMENT

Figure 1:
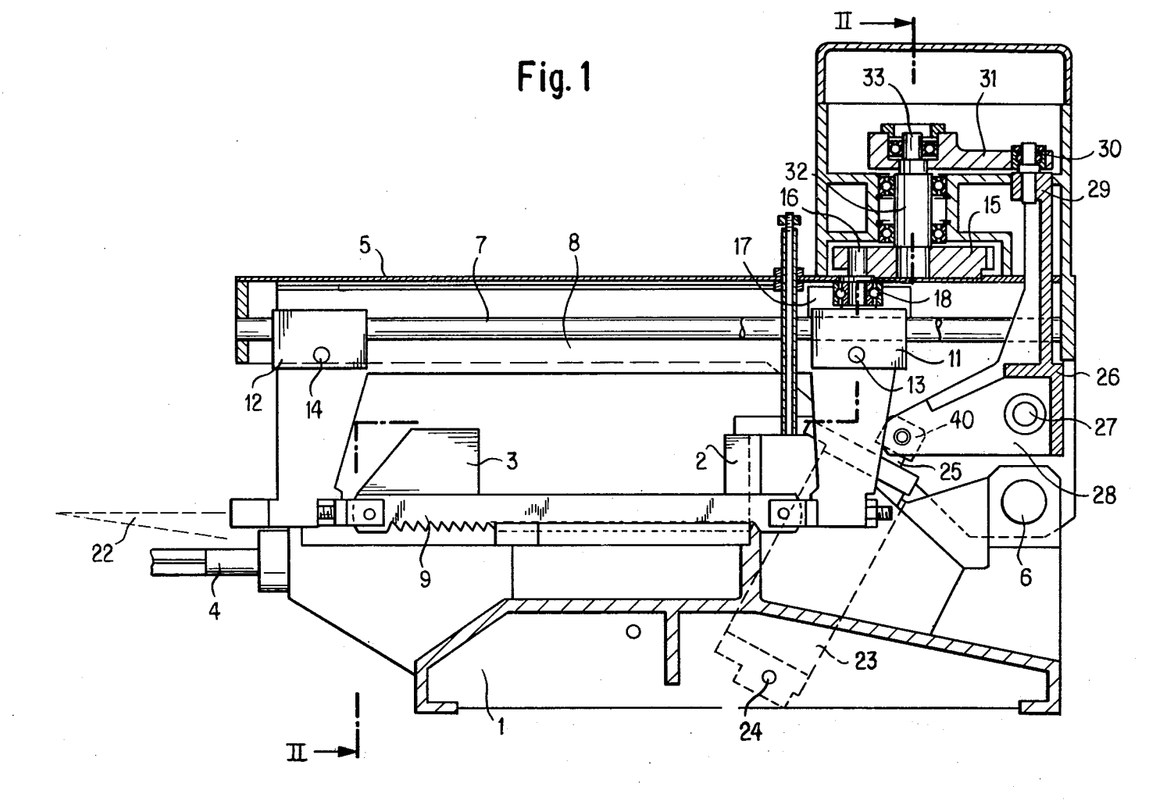
FIG. 1 is a partially sectional side elevational view of a preferred embodiment of the invention.
Figure 2:
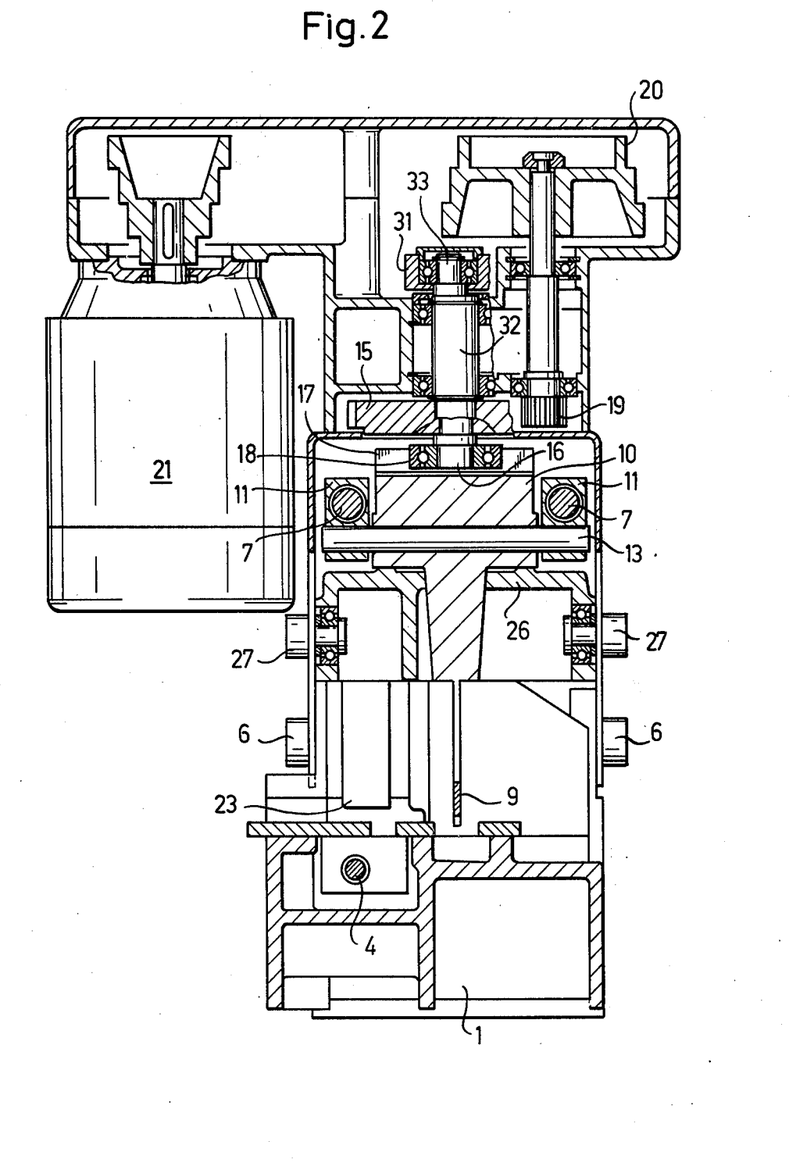
FIG. 2 is a sectional view taken along line II—II of FIG. 1.

Turning now to FIGS. 1 and 2, there is shown a machine frame 1 on the work table of which a workpiece may be immobilized by clamping jaws 2 and 3. For this purpose, the clamping jaw 3 may be displaced by means of a manually operable threaded spindle 4.

A housing designated in its entirety at 5 is articulated to the machine frame 1 by means of a pivot pin 6. In the housing 5 there are fixedly secured two generally horizontally-oriented guide rods 7 on which there is displaceable a saw bow 8 with a saw blade 9 tightened therein. For the purpose of effecting the displacement of the saw bow, the latter has, at each longitudinal end, web-like enlargements 10 to which there are pivotally secured guide pieces 11 and 12 by means of pins 13 and 14. The guide pieces 11 and 12 are displaceable on the guide rods 7. This arrangement ensures that, in case of unequal tensions exerted on the saw blade 9 and the resulting non-uniform bending deformation of the back of the saw bow 8, at all times a play-free guidance of the saw bow 8 on the guide rods 7 will take place and, at the same time, a jamming of the saw bow on the guide rods 7 is prevented.

The drive of the saw bow is effected by a crank disc 15 which journals in the housing 5 and which carries an eccentric crank pin 16. The latter, together with a roller bearing 18 surrounding it, projects into a guide groove 17 provided in the rear web-shape enlargement 10 of the saw bow 8 and extends downwardly, transversely to the longitudinal dimension of the saw blade 9. The crank disc 15 is driven by means of a pinion 19 which is supported in the housing 5 and which, in turn, is rotated by a belt pulley 20 affixed to the same shaft as the pinion 19. The belt pulley 20, in turn, is driven by an electromotor 21 with the intermediary of a belt, not shown.

The rotary motion of the crank disc 15 and the pin 16 cause a reciprocating motion of the saw bow 8. The crank drive, by virtue of its disposition above the saw bow, make it possible that the length of the bow saw machine is substantially that of the saw bow, including the length of its path of reciprocation. Since the saw blade 9 is tensioned in the saw bow 8 at an angle 22 (shown at an exaggerated magnitude for better visibility) with respect to the direction of reciprocation determined by the guide rods 7, the bow saw machine operates with a "pulling" cut. Stated differently, the sawing motion, that is, the work stroke, takes place when the saw bow 8 moves from the left towards the right as viewed in FIG. 1.

In a preparatory step for performing a sawing operation, the housing 5 and thus the saw bow 8 are pivoted upwardly (clockwise, as viewed in FIG. 1) about the pin 6 to such an extent that the workpiece can be fixedly secured between the clamping jaws 2 and 3. Thereafter, the saw blade 9 is positioned on the workpiece and the drive is energized. As described up to this point, during the sawing strokes, the saw blade 9 would, under the weight of the pivotal housing 5 and the components accommodated therein, penetrate into the workpiece. Such a mode of operation, however, which is satisfactory for simple applications, does not provide for the possibility to alter the cutting pressure of the saw blade to adapt it to the material of the workpiece or to lift off the saw blade during the return (idle) strokes to prevent a frictional contact with the workpiece and thus an unnecessary wear of the saw teeth.

In order to be able to regulate the sawing pressure and to be able to lift the saw blade off the workpiece during the idle strokes, the housing 5 is supported on the machine frame 1 with the intermediary of a hydraulic cylinder-and-piston assembly 23, the cylinder of which is pivotally secured to the machine frame 1 at 24. The support of the housing 5 on the piston rod 25 of the cylinder-and-piston assembly 23 is effected by means of an L-shaped bell crank lever 26 which is swingably supported on the housing 5 by means of a pin 27 disposed above the pivot pin 6 which couples the housing 5 to the machine frame 1. The bell crank lever 26 has a substantially horizontally oriented short arm 28, the free end of which is articulated to the piston rod 25. The bell crank lever 26 has a substantially vertically oriented long arm 29 which extends within the housing 5 behind the reciprocating path of the saw bow 8. The free upper end of the arm 29 is coupled by means of a ball joint 30 with a substantially horizontally arranged push rod 31 into which extends an eccentric pin 33 of a shaft 32 of the crank drive. The shaft 32 is affixed to the crank drive disc 15 in axial alignment therewith.

The coupling arrangement involving the eccentric pin 33 has the effect that — assuming, for the sake of explanation, that the cylinder-and-piston assembly 23 is rigidly supported — the saw blade 9 is lifted off the workpiece at the end of the work (sawing) stroke and is positioned again on the workpiece at the end of the idle stroke.

Figure 3:
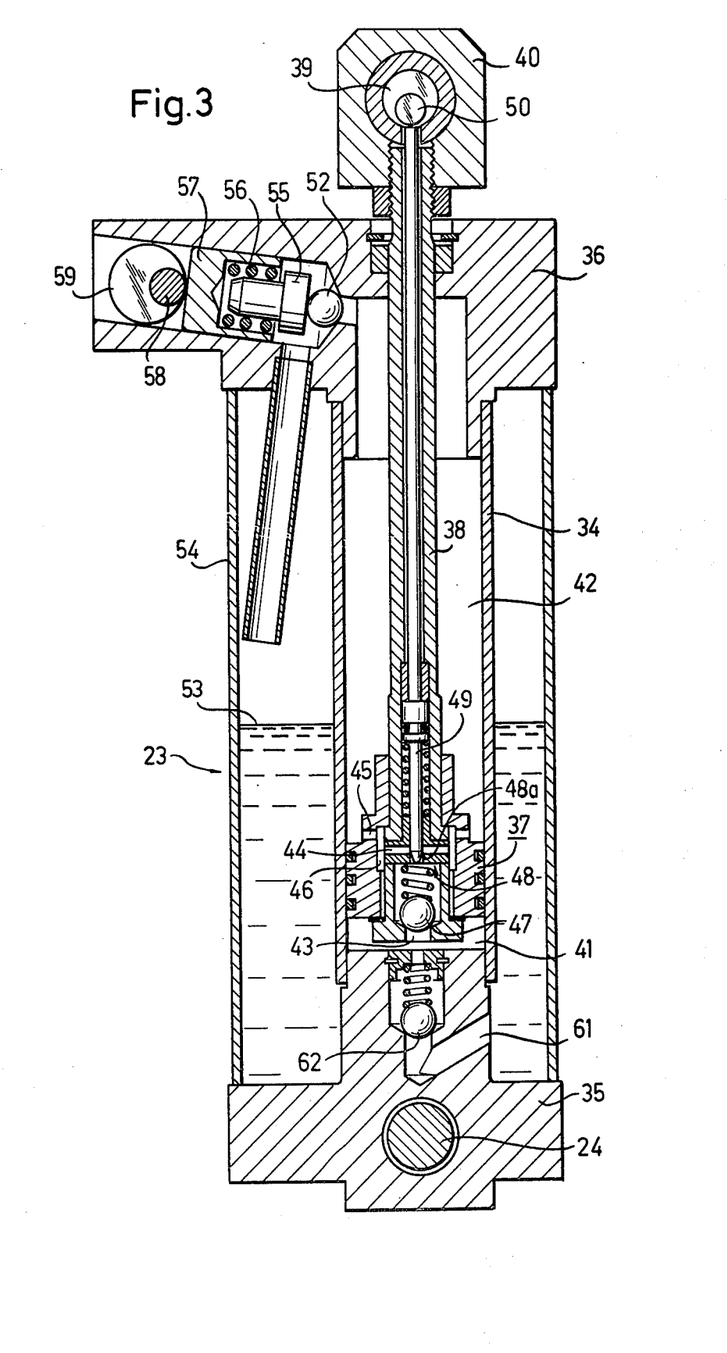
FIG. 3 is an axial sectional view, on an enlarged scale, of a detail of the preferred embodiment illustrated in FIGS. 1 and 2.
Figure 4:
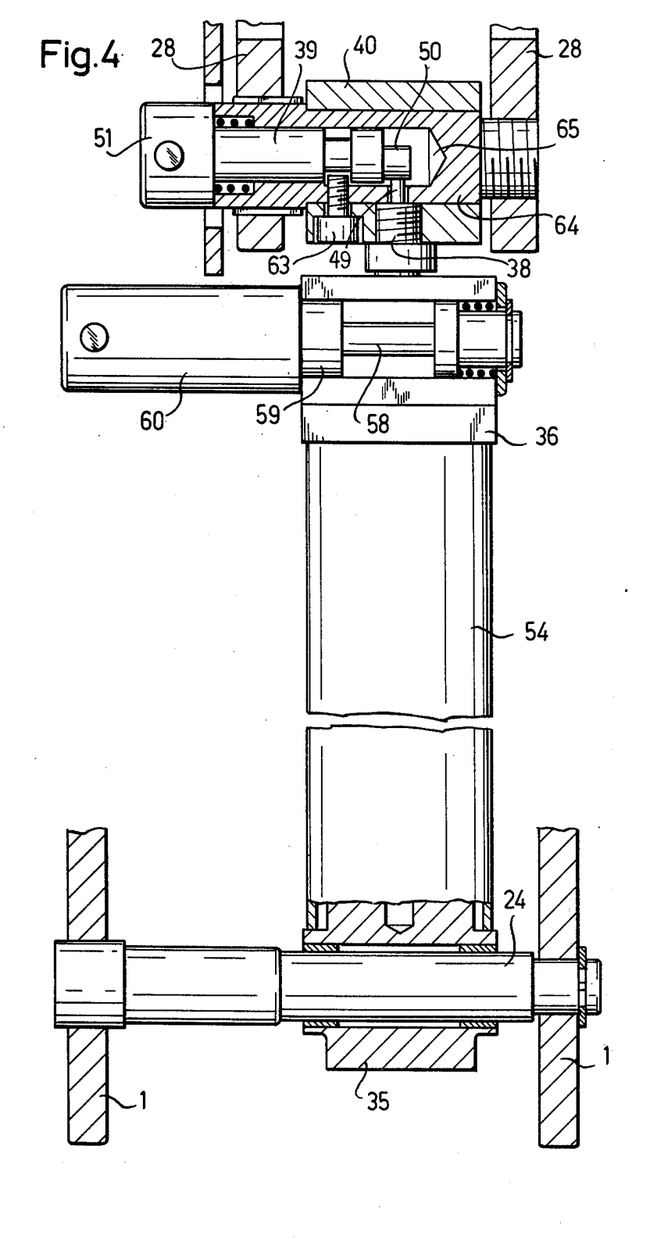
FIG. 4 is a partially sectional side elevational view of the detail shown in FIG. 3, as viewed from the left.

The operation of the cylinder-and-piston assembly 23, illustrated in detail in FIGS. 3 and 4, ensures that for each work stroke the saw blade executes a predetermined feed into the workpiece and further, that the cutting force (that is, the force which urges the saw blade against the workpiece in the direction of feed) is adjustable dependent upon the material of the workpiece.

Turning now to FIG. 3, the cylinder-and-piston assembly 23 includes an inner cylinder 34 which, at its two ends, is closed off by closure blocks 35 and 36, respectively. In the space defined within the cylinder 34, there is displaceably arranged a piston 37 to which there is attached an axially hollow piston rod 38. The latter passes through the closure block 36 in a sealed manner and is, at its externally positioned free end, connected with a block 40 which rotatably receives an adjusting pin 39. The block 40 provides for the articulated connection with the short arm 28 of the bell crank 26, as also seen in FIGS. 1 and 4.

The inner cylinder 34 surrounds a cylindrical space, forming cylinder chambers 41 and 42 at the one and the other side of the piston 37.

The cylinder chamber 41 disposed below the piston 37 is connected with the cylinder chamber 42 situated above the piston 37 by means of serially-arranged ports 43, 44 and 45 as well as an annular chamber 46. In order to ensure that the hydraulic liquid can flow through this path during downward motion of the piston 37 only, that is, only during a decrease of the volume of the chamber 41, the port 43 is associated with a check valve 47 that can open only in response to pressure from the side of the cylinder chamber 41. The flow passage section of the channel 43, 44, 45, 46 is adjustable by means of a needle valve 48, the needle 49 of which is displaceably arranged in the central axial bore of the piston rod 38. The change in the axial position of the needle 49 varies the flow passage section of a metering orifice 48a cooperating with the needle 49 and forming part of the needle valve 48. The setting of the valve needle 49 is effected by means of an eccentric 50 which is carried on the pin 39 and which engages the upper end of the needle 49. As it may be observed in FIG. 4, for a manual rotation of the pin 39 there is provided a knob 51 which may have knurls or radially extending, manually engageable pin members.

In the closure block 36 there is arranged a sawing pressure control valve (throttle valve) 52 through which the hydraulic fluid may flow from the cylinder chamber 42 into a reservoir 53. The latter is constituted by a cylindrical annular space defined by the inner cylinder 34 and an outer cylinder 54 spacedly surrounding the inner cylinder 34. The two axial ends of the reservoir 53 are also closed off by the respective closure blocks 35 and 36. The setting of the sawing pressure control valve 52 is effected by an adjusting pin 59 which is rotatably supported in the closure block 36 and which has a manually engageable portion 60. The adjusting pin 59 carries an eccentric 58 which engages a slide 57 which, in turn, serves as a seat for a biasing spring 56. The latter engages, at its other end, a biasing body 55 which is in contact with a check valve ball 52. It is seen that by rotating the adjusting pin 59 about its axis, the positional change of the eccentric 58 will vary the force with which the check valve ball 52 is urged against its seat formed within the closure block 36.

The liquid reservoir 53 is in communication with the cylinder chamber 41 by means of a channel 61 provided in the closure block 35. A check valve 62 is accommodated within the closure block 35 in the flow path of the channel 61 for ensuring that the hydraulic liquid can flow from the reservoir 53 into the cylinder chamber 41, but not in the reverse direction.

In the description that follows the operation of the above-described hydraulic device for setting the saw blade feed and for controlling the sawing pressure will be set forth.

At the outset it is noted that the bow saw machine is generally arranged in such an orientation that the saw blade 9 extends substantially horizontally, with the saw teeth pointing downwardly, as shown in FIG. 1. Thus, during the idle strokes, with the saw blade 9 lifted off the workpiece, the weight of the housing 5, together with the components accommodated therein, exerts, through the bell crank 26, a downwardly directed force on the piston rod 38. Thus, the piston 37 is urged to move downwardly towards the cylinder chamber (work chamber) 41 as viewed in FIG. 3. During the work strokes, on the other hand, the sawing force generated by the oblique positioning of the saw blade 9 urges the housing 5 and the components accommodated therein to pivot upwardly. Thus, as viewed in FIG. 1, the bell crank 26 is urged to pivot clockwise about the pin 27. As a result, a pulling force is exerted on the piston rod 38 and consequently, the piston 37 is urged upwardly towards the cylinder chamber (work chamber) 42 as viewed in FIG. 3.

If now the sawing force has a magnitude which does not reach the sawing force set with the valve 52, the latter remains closed during the work stroke of the saw blade 9. The result is that the piston 37 cannot move upwardly under the effect of the sawing force which means that the saw blade 9 penetrates into the workpiece with the maximum feed determined by its oblique positioning.

If, on the other hand, the sawing force generated in the saw blade 9 is greater than the force set at the valve 52, the latter is opened against the set force of the spring 56 by the pressure in the cylinder chamber 42. As a result, the piston 37 is displaced upwardly, whereby one portion of the hydraulic fluid contained in the cylinder chamber 42 is driven into the liquid reservoir 53. Simultaneously with this displacement, hydraulic liquid is drawn through the channel 61 and the check valve 62 into the lower cylinder chamber 41. The upward motion of the piston 37 and the piston rod 38 permit a clockwise pivotal motion of the bell crank 26 resulting, during the work stroke, in a limitation of the downwardly-directed sawing force.

During the idle strokes of the saw blade, the weight of the housing 5 and the components accommodated therein exert a force, as stated above, on the piston rod 38 and thus on the piston 37. As a result, hydraulic liquid flows through the channel 43–46 from the cylinder chamber 41 into the cylinder chamber 42 at a flow rate determined by the setting of the needle valve 48. The end result is that the piston 37, during each idle stroke of the saw blade, moves downwardly within the cylinder 34 through a distance which is set by means of the needle valve 48. Thus, during each idle stroke the saw blade 9 is, for the beginning of the successive work stroke, so oriented that its position is lower with respect to the workpiece than at the beginning of the preceding work stroke. Thus, the extent of the vertical blade feed for the work stroke is determined by the setting of the needle valve 48. The higher position of the valve needle 49, the greater the opening of the metering orifice 48a, the greater the downward displacement of the piston 37 during the idle stroke and thus the greater the distance (feed) through which the saw blade 9 is lowered.

Were the saw operated at constant speed at all times, the needle valve 48 could be set to a fixed value, so that during each idle stroke the saw blade is oriented for a maximum feed that corresponds to its inclined position relative to the direction of reciprocation. Since, however, as it may be observed particularly from FIG. 2, the belt drive between motor 21 and belt pulley 20 is adjustable according to several transmission ratios, the needle valve 48 should be adjustable in the manner described above, since the idle strokes during which the piston 37 moves downwardly in the cylinder 34 last different periods for the different belt settings.

As it may be seen in FIG. 4, the block 40 coupled to the piston rod 38 is not directly articulated to the arm 28 of the bell crank lever 26. Instead, such articulation is effected by means of a bearing portion 64 which is secured in the block 40 by means of a screw 63. The bearing portion 64 rotatably receives the rotatable setting pin 39 in an axial blind bore 65.

It will be understood that the above description of the present invention is susceptible to various modifications, changes and adaptations, and the same are intended to be comprehended within the meaning and range of equivalents of the appended claims.

What is claimed is:

1. In a bow saw machine having a machine frame; means for immobilizing a workpiece in the machine; a housing; means for pivotally attaching the housing to the machine frame for providing for a swinging motion of the housing generally in a vertical plane; a saw bow supporting a saw blade in a generally horizontal orientation during the sawing operation; guide means supported in said housing for longitudinally displaceably mounting the saw bow; a drive motor; a crank drive supported in the housing and having a first eccentric coupled to the saw bow for effecting a reciprocating motion thereof along a path of reciprocation determined by the guide means; the crank drive being located above the saw bow substantially within the zone of its path of reciprocation; the improvement comprising
   a. a hydraulic cylinder-and-piston means for controlling the sawing pressure and the feed of the saw blade; said cylinder-and-piston means being supported in said machine frame;
   b. a bell crank including a pivot supported in said housing; said bell crank having first and second arms extending from said pivot and being arranged at an angle to one another; each arm having an outer end; the outer end of said first arm of said bell crank being pivotally connected to said cylinder-and-piston means; and
   c. a horizontal push rod having first and second ends; said first end of said push rod being connected to a second eccentric of said crank drive for effecting a horizontal reciprocating motion of said second end of said push rod; said second end of said push rod being articulated to the outer end of said second arm of said cylinder-and-piston means for lifting said saw blade off the workpiece during each idle stroke of the saw bow and for lowering the saw blade into a sawing position for the beginning of each work stroke.

2. A bow saw machine as defined in claim 1, wherein said cylinder-and-piston means is arranged laterally adjacent said path of reciprocation in the vicinity of the pivotal attachment of said housing to said machine frame; said cylinder-and-piston means including a piston rod; said bell crank beng L-shaped; said first arm of said bell crank being relatively short and being connected to said piston rod; said second arm of said bell crank being relatively long and extending within said housing in a substantially vertical orientation behind said path of reciprocation.

3. A bow saw machine as defined in claim 1, further comprising a ball joint constituting the articulated connection between said second end of said push rod and said outer end of said second arm.

4. A bow saw machine as defined in claim 1, wherein said cylinder-and-piston means includes
   a. a cylinder surrounding a cylinder space;
   b. closure means for sealing off said cylinder space at both axial ends;
   c. a piston slidably arranged in said cylinder space and dividing said cylinder space into first and second work chambers at the one and the other side of said piston;
   d. a piston rod having one end attached to said piston and another end attached to said bell crank whereby said piston is urged by said crank drive in the one and the other direction tending to reduce the volume of said first work chamber during each work stroke of said saw bow and tending to reduce the volume of said second work chamber during each idle stroke of said saw bow;
   e. a reservoir for accommodating hydraulic liquid;
   f. first channel means connecting said work chambers with one another;
   g. an adjustable feed control valve disposed in said first channel means for determining the flow passage thereof to set the magnitude of the axial displacement of said piston towards said second work chamber during each idle stroke for determining the feed of said saw blade at the beginning of each work stroke;
   h. second channel means connecting said reservoir with said second work chamber;
   i. third channel means connecting said first work chamber with said reservoir; and
   j. an adjustable sawing pressure control valve disposed in said third channel means for establishing hydraulic communication between said first work chamber and said reservoir when a pressure, generated in said first work chamber by said piston urged towards said first work chamber during each work stroke of said saw bow in response to the sawing pressure thereof, exceeds a predetermined magnitude set at said sawing pressure control valve.

5. A bow saw machine as defined in claim 4, wherein said first channel means and said feed control valve are arranged in said piston; said feed control valve being constituted by a needle valve having a valve needle and a metering orifice controlled by the position of said valve needle; said piston rod being axially hollow; said valve needle having a portion extending coaxially within said piston rod; further comprising an eccentric adjusting device supported on the articulation between said piston rod and said bell crank; said valve needle being operatively connected to said eccentric adjusting device for altering the position of said valve needle with respect to said metering orifice by said eccentric adjusting device.

6. A bow saw machine as defined in claim 4, further comprising a check valve provided in said first channel means between said feed control valve and said second work chamber; said check valve permitting a flow of hydraulic fluid in said first channel means only from said second work chamber into said first work chamber.

7. A bow saw machine as defined in claim 4, wherein said cylinder is a first cylinder; further comprising a second cylinder surrounding said first cylinder; said cylinders together defining, between themselves, an annular cylinder space constituting said reservoir.

8. A bow saw machine as defined in claim 4, further comprising a check valve provided in said second channel means; said check valve permitting a flow of hydraulic fluid in said second channel means only from said reservoir into said second work chamber.

9. A bow saw machine as defined in claim 8, wherein said closure means includes a closure block containing said second channel means and said check valve.

10. A bow saw machine as defined in claim 4, further comprising an eccentric adjusting device connected to said sawing pressure regulating valve for setting the closing force thereof.

11. A bow saw machine as defined in claim 4, wherein said closure means includes a closure block containing said third channel means and said sawing pressure control valve.

* * * * *

UNITED STATES PATENT AND TRADEMARK OFFICE
CERTIFICATE OF CORRECTION

PATENT NO. : 4,015,500

DATED : April 5th, 1977

INVENTOR(S) : Paul Stolzer

It is certified that error appears in the above–identified patent and that said Letters Patent are hereby corrected as shown below:

In the heading of the patent, insert --[30] Foreign Application Priority Data:  June 6th, 1975, Germany, 2525154--.

Column 4, line 10, change "make" to --makes--.

Column 6, line 66, after "higher" insert --the--.

Column 8, line 3, change "beng" to --being--.

Signed and Sealed this twelfth Day of July 1977

[SEAL]

Attest:

RUTH C. MASON
Attesting Officer

C. MARSHALL DANN
Commissioner of Patents and Trademarks